Jan. 6, 1948.   J. E. SOCKE   2,433,870
CONTAINER HANDLE
Filed Dec. 29, 1943
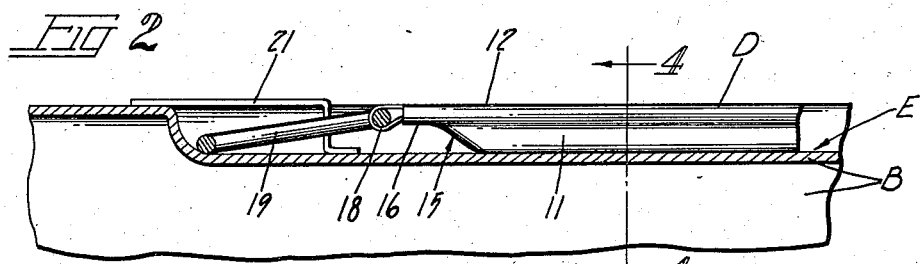
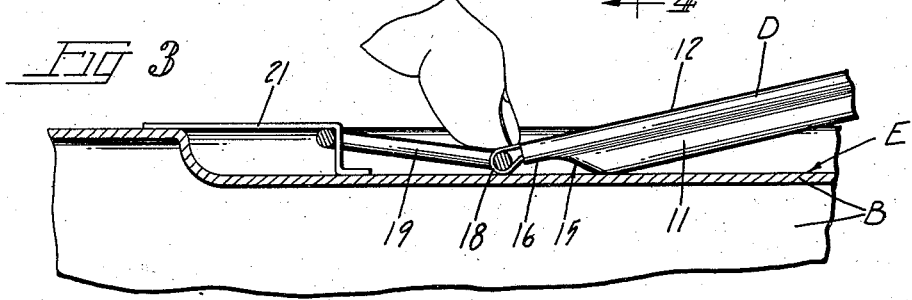
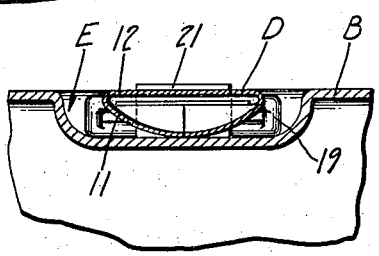
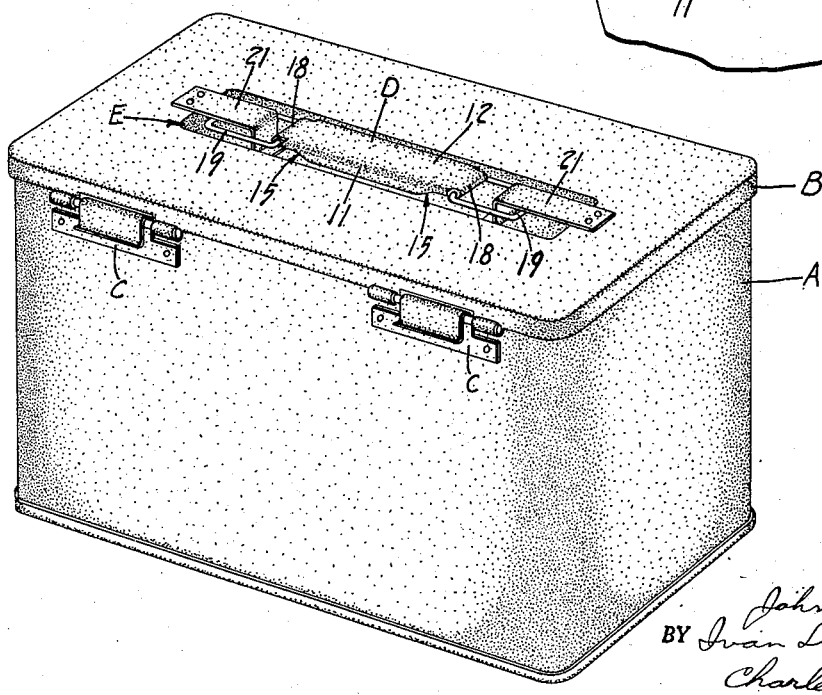
INVENTOR.
John E. Socke
BY Ivan D. Thornburgh
Charles H. Erne
ATTORNEYS Patented Jan. 6, 1948

2,433,870

UNITED STATES PATENT OFFICE 2,433,870

CONTAINER HANDLE

John E. Socke, Pelham Manor, N. Y., assignor to American Can Company, New York, N. Y., a corporation of New Jersey Application December 29, 1943, Serial No. 516,073

4 Claims. (Cl. 16—115)

The present invention relates to containers and has particular reference to a collapsible carrying handle which is attached to the container and which may be grasped readily to bring it into container carrying position even though it lies flat against the container or is disposed in a sunken panel in the container.

Collapsible handles used for carrying containers usually are constructed to lie flat against a wall of the container in order to occupy less space and to be out of the way. Frequently such handles are disposed in sunken panels or recesses formed in a wall section of the container and thus are in a more or less protected position inwardly of the outer surface of the container. However, such close lying and protected handles are sometimes difficult to grasp, especially in cold weather when the containers must be handled while gloves are being worn.

The instant invention contemplates overcoming this difficulty by providing a handle that may be partially lifted by a slight pressure on one end thereof so that the opposite end will rise sufficiently to enable the handle to be grasped even while wearing heavy gloves.

An object of the invention is the provision of a carrying handle for a container wherein the handle is formed with a projecting part disposed adjacent one end and spaced inwardly from the end whereby pressure applied to the end of the handle lifts its opposite end clear of the container so that the handle may be grasped readily for bringing it into container carrying position.

Numerous other objects and advantages of the invention will be apparent as it is better understood from the following description, which, taken in connection with the accompanying drawings, discloses a preferred embodiment thereof.

Referring to the drawing:

Figure 1 is a perspective view of a container with a cover in closed position and a carrying handle, embodying the instant invention, disposed in a recess formed in the cover;

Fig. 2 is an enlarged fragmentary sectional view of the container cover and illustrating one end of the handle when the handle is in collapsed position in the recess;

Fig. 3 is a view similar to Fig. 2, showing the handle tilted upwardly by pressure applied at an end thereof; and Fig. 4 is a transverse section of the handle and cover as taken substantially along the line 4—4 in Fig. 2.

As a preferred embodiment of the instant invention the drawing illustrates a rectangular shaped sheet metal container A which is adapted for use as a lunch kit, tool box, ammunition container, or the like. The container is fitted with a cover B connected by hinges C to a side wall of the container. A collapsible handle D is provided for carrying the container. The drawing shows the handle located in a sunken panel or recess E formed in the cover so that the handle when not in use will be out of the way and protected, although the invention is equally well adapted to handles which lie flat against an outside wall of the container when not in use.

The handle D is made preferably from one piece of sheet metal and comprises a tubular body or hand grip element or portion 11 of semi-circular or oval conformation with a flat top section 12. The oval portion of the handle is designed to fit the hand when the handle is used to carry the container and the flat top portion of the handle makes it flush with the top of the container when in collapsed position within the recess E formed in the cover B.

The ends of the handle are formed with an under-cut stepped section 15 which extends from the body portion 11 along an upwardly inclined and preferably curved line into a reduced thickness flat section 16 disposed adjacent and parallel with the flat top portion of the handle. The outer end of the flat section 16 terminates in a loop 18 which is connected by a loose fitting rectangular shaped link 19 in loose floating relation to an elongated eyelet clip 21 secured to the container in any suitable manner, such as by welding. The drawing shows one end of the clip secured to the top wall of the container cover B while the other end is disposed in the recess E and may be secured to the bottom wall of the recess. There is one of these link and clip connections at each end of the handle.

The clips 21 are elongated sufficiently to permit the links 19 to slide back adjacent the outer ends of the recess E when the handle is in its collapsed position within the recess so that the handle will lie flat, and to slide forward adjacent the inner ends of the clips when the handle is in a raised carrying position clear of the recess.

When the ordinary handle is in a collapsed position within the recess E or when it lies flat against the outside wall of the container where such a construction is used, it is difficult to pick up, especially when gloves are worn. However, in the case of a handle constructed according to the instant invention, it is merely necessary to press on the stepped section 15 at either end of the handle, as best shown in Fig. 3. Pressure on one end of the handle depresses that end and lifts the opposite end into a position where the fingers may be inserted readily between the handle body and the container. With such a provision the handle may be gripped and brought into carrying position with one motion. In fact, with such a construction of handle the entire operation may be done easily with one hand.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A collapsible carrying handle for containers and other articles having a recess formed in a surface thereof wherein a said handle is attached and disposed in protected position with the bottom of the handle resting against the wall of the recess and with the top of the handle substantially flush with said surface, said handle comprising a one piece hollow sheet metal hand grip having a relatively thick semi-circular central body section terminating at its opposite ends in relatively thin sections spaced vertically away from the wall of said recess and terminating in looped sections, and a pair of links engaged in said looped sections for connecting hingedly the ends of the handle to the container, the opposite ends of said links having a loose floating connection with a wall of said container, whereby pressure applied to either end of the handle adjacent one of the links tilts the handle and thereby lifts the opposite end out of the recess so that the handle may be grasped readily for bringing it into handle carrying position.

2. A collapsible carrying handle for containers and other articles, comprising a hand grip element including a substantially flat main central body portion adapted to lie closely against a surface of the container when the handle is not in use, said handle body portion having a relatively thin portion disposed in the plane of the top of said body portion adjacent each of its opposite ends spaced away from said surface when said central body portion is resting against the container surface, the opposite ends of said handle body portion having a loose sliding connection with said container surface to dispose the handle closely against said surface when in non-carrying position, whereby pressure applied to the outer thinned section at the end of the handle tilts the latter and elevates its opposite end clear of the said container surface, so that the handle may be grasped readily for bringing the same into container carrying position.

3. A carrying handle for containers and other articles having a recess formed in a surface thereof wherein a said handle is attached and disposed in protected position with the top of the handle substantially flush with said surface, said handle having a substantially straight flat main body portion provided on its bottom surface with a stepped fulcrum spaced longitudinally inwardly from one end thereof, an outermost thinned portion of the handle being disposed in the plane of the top of said body portion and in spaced overhanging relation to its said bottom surface, the opposite ends of said handle having a loose horizontally slidable connection with said container surface within the latter to dispose the handle within said recess substantially flush with said surface when in non-carrying position, whereby pressure applied to said thinned outermost end of the handle elevates its opposite end out of the said protecting recess, so that the handle may be readily grasped for bringing the same into container carrying position.

4. A carrying handle for containers and other articles having a surface wherein said handle is hingedly attached at its terminal ends by opposed link members so that the handle may be placed in carrying and non-carrying positions, comprising a pair of oppositely disposed elongated clip members on the container, said handle including a central substantially straight hollow sheet metal hand grip member having a flat body portion connected at its opposite ends to said link members, the latter being respectively slidable in said clip members, said hand grip member being closely engageable with the container surface when in non-carrying position and having at its extreme end a portion of reduced thickness disposed in the plane of the top of the handle member, said reduced handle end being spaced vertically from said container surface when the handle is in non-carrying position, whereby pressure applied to said handle end tilts the handle and lifts its opposite end clear of the container surface so that the handle may be readily grasped for bringing the same into container carrying position.

JOHN E. SOCKE.

REFERENCES CITED

The following references are of record in the file of this patent:

UNITED STATES PATENTS

| Number | Name | Date |
|---|---|---|
| 1,074,133 | Neustaedter | Sept. 30, 1913 |
| 1,495,752 | La Rue | May 27, 1924 |
| 2,314,799 | Piker | Mar. 23, 1943 |

FOREIGN PATENTS

| Number | Country | Date |
|---|---|---|
| 409,032 | Great Britain | Apr. 26, 1934 |